Figure 1:
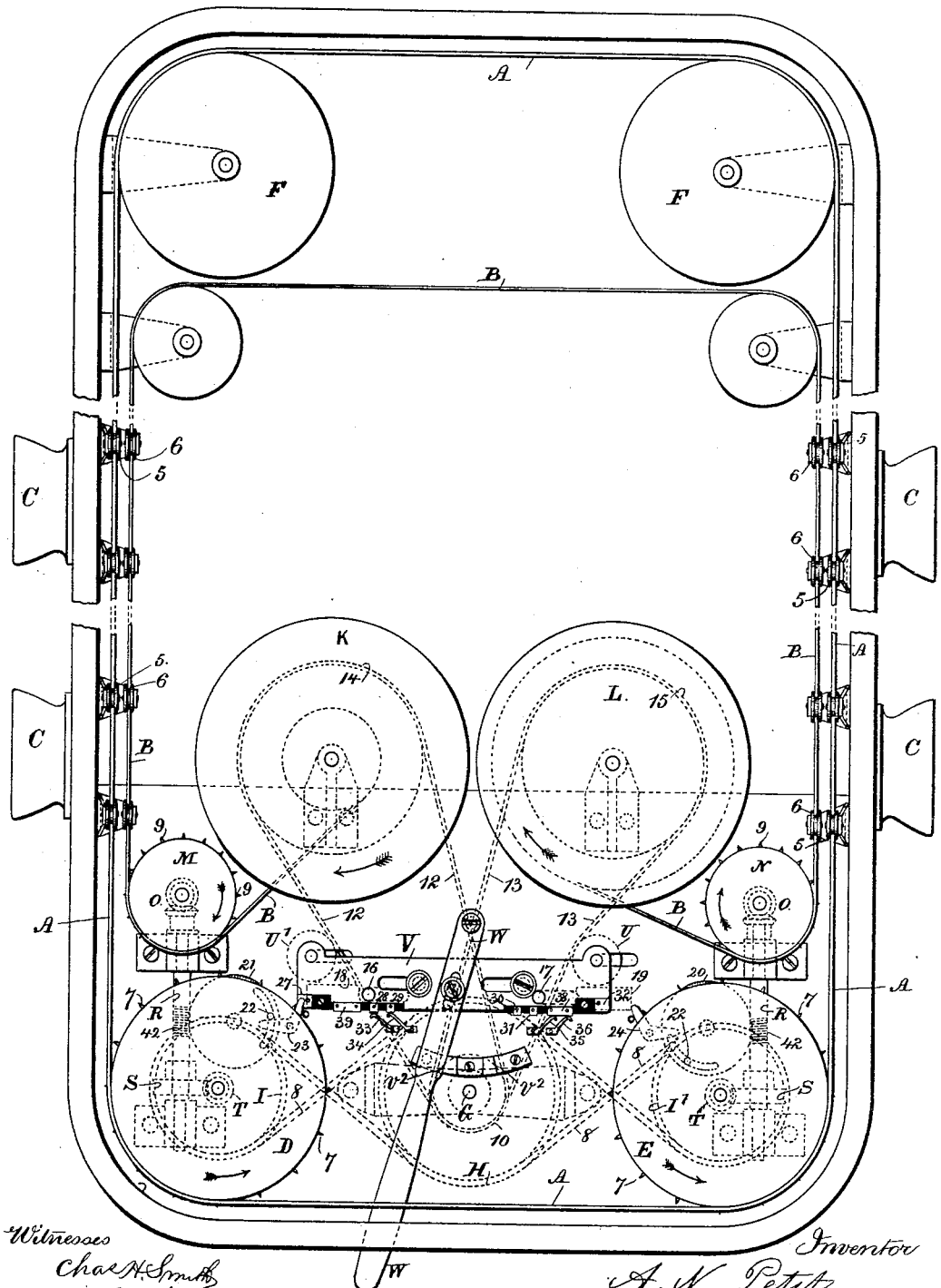

(No Model.) 3 Sheets—Sheet 1.

A. N. PETIT.
APPARATUS FOR EXHIBITING SUCCESSIVE PHOTOGRAPHS.

No. 560,425. Patented May 19, 1896.

(No Model.) 3 Sheets—Sheet 2.

A. N. PETIT.
APPARATUS FOR EXHIBITING SUCCESSIVE PHOTOGRAPHS.

No. 560,425. Patented May 19, 1896.

Witnesses
Chas H Smith
J Stail

Inventor
A. N. Petit
per Lemuel W. Serrell
Atty

ANDREW B GRAHAM, PHOTO-LITHO, WASHINGTON, D.C.

(No Model.) 3 Sheets—Sheet 3.
A. N. PETIT.
APPARATUS FOR EXHIBITING SUCCESSIVE PHOTOGRAPHS.
No. 560,425. Patented May 19, 1896.
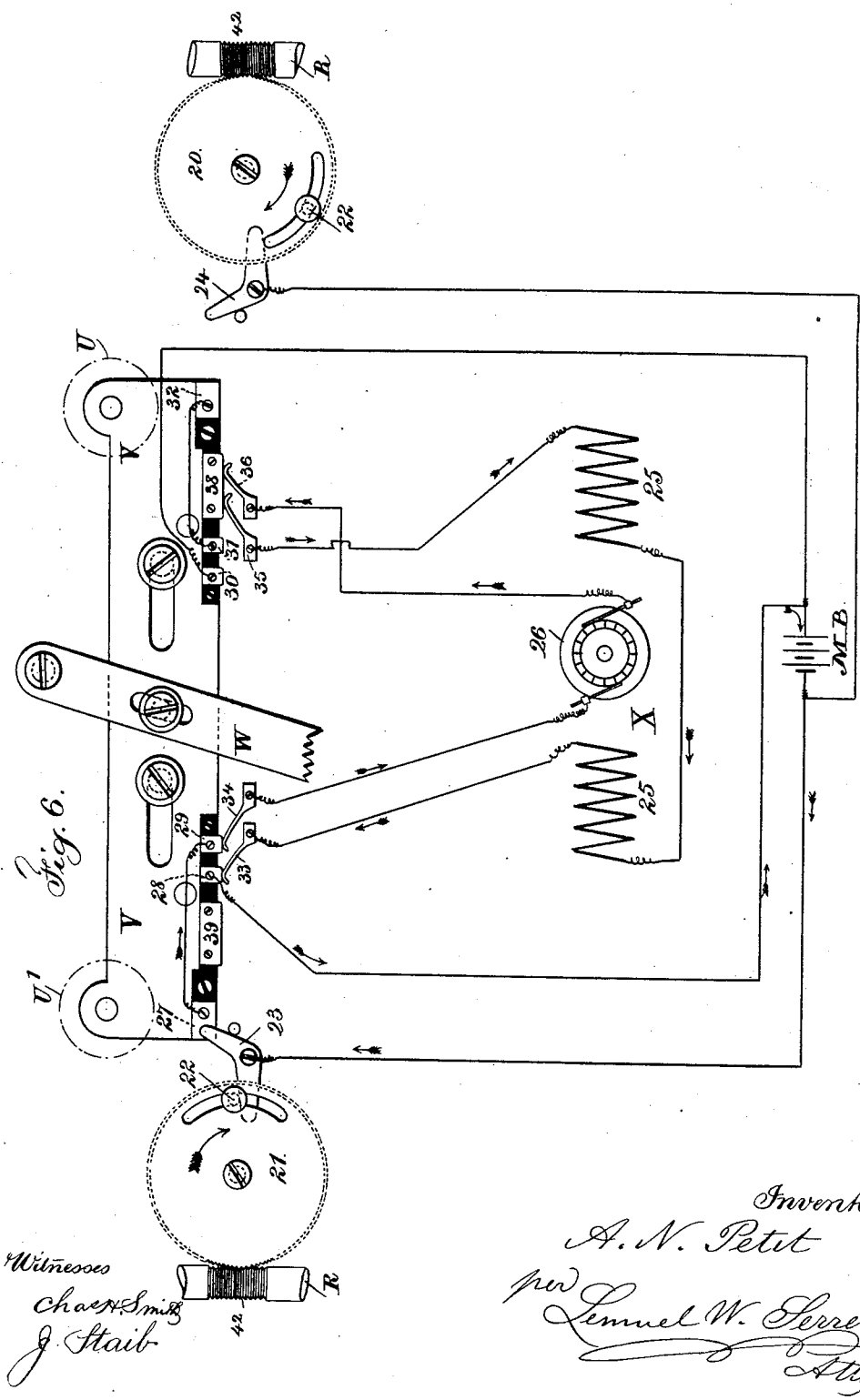

UNITED STATES PATENT OFFICE.

ADEMOR N. PETIT, OF ROSEVILLE, NEW JERSEY, ASSIGNOR TO HIMSELF, AND JOSEPH LIVINGSTON, OF NEW YORK, N. Y.

APPARATUS FOR EXHIBITING SUCCESSIVE PHOTOGRAPHS.

SPECIFICATION forming part of Letters Patent No. 560,425, dated May 19, 1896.

Application filed September 25, 1895. Serial No. 563,582. (No model.)

*To all whom it may concern:*

Be it known that I, ADEMOR N. PETIT, a citizen of the United States, residing at Roseville, in the county of Essex and State of New Jersey, have invented an Improvement in Apparatus for Exhibiting Successive Photographs, of which the following is a specification.

Photographs have heretofore been taken upon a strip of sensitized material to represent moving objects, the various positions being shown in succession, and such pictures have been thrown successively upon a screen.

The object of the present invention is to enable one or more persons to examine the photographed pictures as they are passed in succession before the eye and at the same time to cut off the rays of light, except momentarily, for each picture, so that the movements of the pictures will not be apparent and they will be exhibited in succession and apparently as though standing still, but the figures or objects photographed while moving will appear in the pictures as though they were moving. In accomplishing this object openings are provided in the apparatus and usually fitted with magnifying glasses or lenses, and the belt of pictures is moved along behind such openings and there is a septum-belt between the pictures and the eyepieces, in which septum-belt there are openings at regular intervals, and the septum-belt is moved much faster than the picture-belt and usually in opposite directions, so that when a picture is in the proper position for the eyepiece an opening in the septum-belt comes also opposite the eyepiece, enabling the observer to momentarily see the picture, and the septum-belt interposes between the picture and the eyepiece until the next picture in succession is in position and another opening in the septum-belt passes by, allowing such picture to be observed by the person looking through the eyepiece, and in this manner the pictures are observed in succession and with sufficient rapidity to be substantially a continuous picture, in which the figures and objects are moving into different positions, and in this manner the entire series of photographic pictures can be observed by different individuals located at the different eyepieces.

It is generally advantageous to draw the belt of pictures off of one roll or reel and wind the same upon a second roll or reel, the same being within the space bounded by the septum-belt as it is caused to move with rapidity by the action of the rolls around which it passes; but any suitable means for winding up or unwinding the picture-belt may be made use of.

Figure 3:
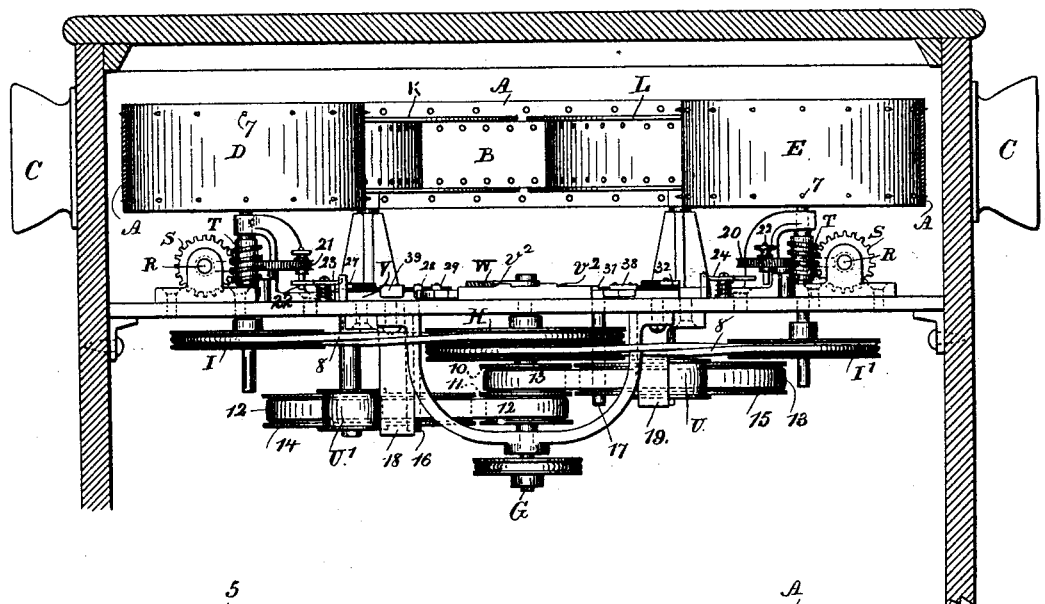
Figure 4:
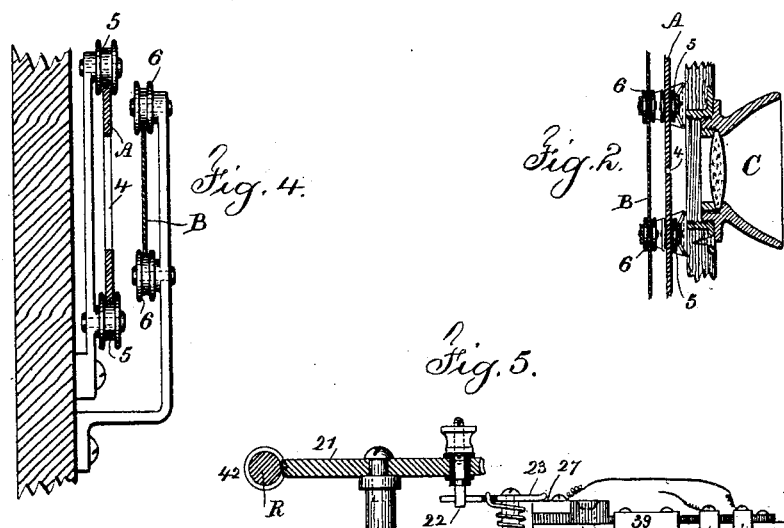
Figure 2:
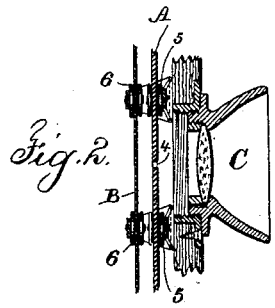
Figure 5:
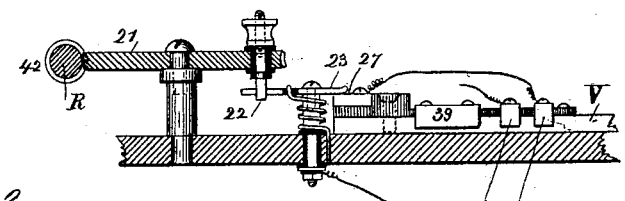
Figure 7:
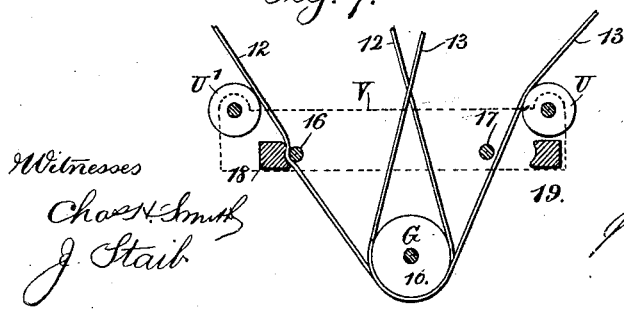

In the drawings, Figure 1 is a general plan of the apparatus. Fig. 2 is a horizontal section through a part of the septum-belt and of the picture-belt and one of the eyepieces. Fig. 3 is a general elevation with the case and septum-belt in section. Fig. 4 is an elevation of the supporting-rollers for the septum and picture belts. Fig. 5 is a detached view of the circuit-breaker, and Fig. 6 is a diagram of the electric connections. Fig. 7 is a diagram of the belt-tighteners and clamps.

The septum-belt A is of any suitable material, advantageously of celluloid, with openings 4 in such belt at the proper intervals apart, and the belt is sufficiently wide for the openings to be made in the same without destroying the strength of the septum-belt, and such openings are to be large enough for observing the pictures upon the picture-belt B, and it is advantageous to make perforations along the top and bottom portions of the septum and picture belts near their edges for the reception of pins upon the reels or rolls around which the respective belts pass, so that such belts may be guided and held in their proper positions and moved with reliability at the proper speeds.

The eyepieces C may be of any suitable character and advantageously provided with glasses or lenses, and the septum-belt A is guided by the studs or rolls 5, that are closely adjacent to the eyepieces and at the rear of the same, so that the septum-belt may travel freely behind the eyepiece as guided by the rolls 5 and the picture-belt travel freely between the rolls 6, whereby such belts will be held in their proper positions while being moved along adjacent to a row of any desired length of eyepieces, through which different persons can be observing the pictures as presented.

I have represented eyepieces on the opposite sides of the apparatus, as this is a convenient manner for arranging the same, and suitable light is provided behind the pictures, so that they may be observed through the eyepieces, and I find it advantageous to move the picture-belt along gradually in one direction and to move the septum-belt with rapidity in the other direction, the openings 4 being provided in the septum-belt at distances apart proportioned to the relative speeds of the septum-belt and picture-belt, so that each time a picture on the picture-belt is in position to be properly observed at the eyepiece an opening in the septum-belt passes by to allow the picture to be seen, and the septum-belt cuts off the vision of the picture while the picture-belt is moved along to bring the next picture into position to be observed. I remark that any suitable mechanism may be made use of for giving motion to these belts. I have, however, represented the pulleys D, E, and F as adapted to move and guide the septum-belt, such pulleys being advantageously provided with pins 7 to pass through perforations in the upper and lower portions of the septum-belt to hold and guide such septum-belt in its movements. I have represented a shaft G as adapted to receive motion from an electric or other motor, and upon the same are the pulleys H for the cords or belts 8 to the pulleys I I' upon the shafts that carry the pulleys D E for the septum-belt, so that such septum-belt may be moved with regularity and at the desired speed.

Where the picture-belt B is wound upon one pulley or reel and unwound from another pulley or reel, it is advantageous to employ the pulleys or reels K and L that are of a size adapted to receive the picture-belt—that is to say, the heads or disks of such reels are sufficiently far apart for the picture-belt to pass freely in between them, and there are picture-moving pulleys M and N with pins 9 upon them passing into holes near the top and bottom edges of the picture-belt, so as to insure a proper movement of the picture-belt and prevent slipping, and the picture-moving pulleys M and N are connected with the pulleys D and E, respectively, by suitable gearing. I prefer to use the bevel-gears O, shafts R, worm-wheels S, and worm-pinions T, the parts being so proportioned that the desired relative motions are insured in the septum-belt and picture-belt, and it will be seen by this arrangement that the picture-moving pulleys M and N receive motion from the shafts of the respective pulleys D and E through the worm-pinions, worm-wheels, shafts, and bevel-gears, as the parts are geared together in pairs, as shown.

The reels K and L require to be moved so that the one will wind up the picture-belt as rapidly as it is moved along and the other will give off the picture-belt in the same proportion. With this object in view it is advantageous to rotate the reels K and L by friction, so as to provide for the differences in diameter as the picture-belt is wound on or drawn off the respective reels. With this object in view the pulleys 10 and 11 and belts 12 and 13 connect the driving-shaft G with the pulleys 14 and 15 upon the shaft of the reels K and L, and the tension upon the belts should be sufficient to wind up the picture-belt without injury to the same and to apply the proper friction to the reel from which the picture-belt is being drawn.

I prefer to use the idlers U and U' upon the slide V, which idlers act to tighten either the belt 12 or the belt 13, and I also provide pins 16 and 17 upon the slide V and clamp-bars 18 and 19 upon the frame of the machine, so that when the slide V is moved in one direction one belt 12 is loosened and held by the pin 16 acting against such belt and holding it to the clamp 18, whereby the belt will apply a friction to prevent the reel K from rotating too fast as the picture-belt is drawn off the same, and the same movement of the slide V causes the idler U to act against the belt 13 to tighten the same and cause such belt to rotate the reel L with sufficient speed to wind up the picture-belt as it is delivered from the pulley N, and when the slide V is moved in the opposite direction the reverse actions take place, and it is to be understood with the apparatus constructed in this manner the shaft G will be rotated in the proper direction by the power and the belt of pictures drawn off the reel K and wound upon the reel L as such pictures are exhibited in the proper succession, and when the pictures have all been drawn off the reel K the apparatus is to be stopped, the slide V shifted, and the shaft G rotated in the opposite direction to draw the belt of pictures from the reel L and wind the same upon the reel K ready to be again exhibited when the shaft G is revolved in the opposite direction.

The slide V may be moved by the hand-lever W, and I prefer to actuate the motor automatically. With this object in view I provide a fine worm-pinion 42 on each shaft R that turns slowly the wheels 20 21, that are provided with pins 22 in segmental slots, and which pins actuate the circuit-closing levers 23 24, and the pins are so placed in the segmental slots as to actuate the circuit-lever 23 or 24 and stop the electric motor just as the belt of pictures has drawn off its reel K or L.

An illustration of the circuit connections to a motor is shown in Fig. 6. The fields of the motor are indicated at 25 and the armature at 26, and there are insulated contacts 27 28 29 30 31 32 on the slide V and stationary spring-contacts 33, 34, 35, and 36 for the circuit connections.

Supposing that the motor X is propelling the parts, as in Fig. 1, the motor is stopped when the belt of photographs has been drawn almost off the reel K by the pin 22 on the wheel 21 separating the lever 23 from the contact 27 and breaking the circuit.

It will be understood that when in action the current from M B goes, as indicated by the arrows, by 23 27 29 34 to armature 26, and by 36 38 35 through fields, and by 33 and 28 to M B. If now the slide V is moved by the lever W to change the tension of the belts, as before set forth, the direction of rotation of the motor also will be changed, the current going the other way through 24 32 31 36 26 34 39 33 25 35 30 back to the battery or source of electric energy M B.

It is advantageous to provide a spring-lever W and stops at V² to hold the lever in one extreme position or the other or midway with the apparatus out of action. The pins 22 being adjustable in the segmental slots of the wheels allow of their positions being changed to accommodate different lengths of picture-belts so as to break the circuit to the motor when the picture-belt has been moved to the proper point.

It is to be understood that the parts of this mechanism are to be supported upon any suitable framework or plates, and the whole apparatus can be inclosed in a box or case to exclude dust and prevent injury to the pictures.

The camera made use of in taking the pictures successively of moving objects upon the picture-belt may be of any suitable character and does not require special description herein, as cameras of this character are known in the market.

I claim as my invention—

1. The combination in an apparatus for exhibiting successive photographs, of a picture-belt and means for moving the same along progressively, an endless septum-belt having openings at intervals and means for moving the same along progressively, and eyepieces adapted to observing the pictures, the parts being so proportioned and adjusted that an opening in the septum-belt passes the eyepiece when a picture is in position to be observed, substantially as set forth.

2. The combination in an apparatus for exhibiting successive photographs, of a picture-belt having the pictures in succession and perforations near the edge, pulleys with pins for passing into the perforations in the picture-belt, an endless septum-belt having openings at intervals and perforations near the edge, pulleys around which such septum-belt passes and means for rotating the respective pulleys and moving the septum-belt in harmony with the picture-belt, substantially as set forth.

3. The combination in an apparatus for exhibiting successive photographic pictures, of a picture-belt and mechanism for moving the same progressively, a septum-belt having openings at intervals through which the pictures can be observed, mechanism for moving the septum-belt progressively, eyepieces through which the pictures can be observed and guides adjacent to the eyepieces for holding the picture-belt and the septum-belt in their proper relative positions, substantially as set forth.

4. The combination in an apparatus for exhibiting successive photographs, of a picture-belt containing the pictures in succession, there being perforations in such picture-belt, pulleys with projecting pins for giving motion to the picture-belt, a septum-belt having openings at intervals through which the pictures can be observed, pulleys and pins for giving motion to such septum-belt, and gearing connecting the septum-belt pulley and the picture-belt pulley for moving the septum-belt and the picture-belt with regularity and at their proper relative speeds, substantially as set forth.

5. The combination in an apparatus for exhibiting successive photographs, of a picture-belt containing the pictures in succession there being perforations in such picture-belt, pulleys with projecting pins for giving motion to the picture-belt, a septum-belt having openings at intervals through which the pictures can be observed, pulleys and pins for giving motion to such septum-belt and connections between the septum-belt pulley and the picture-belt pulley for moving the septum-belt and the picture-belt in opposite directions and at their proper relative speeds, substantially as set forth.

6. The combination in an apparatus for exhibiting successive photographs, of a picture-belt for the pictures in succession, there being perforations in the belt, a pulley and pins for giving motion to the picture-belt, a reel for containing the belt of pictures and another reel upon which the belt of pictures is wound as drawn along progressively and friction mechanism for giving motion to the respective reels, substantially as set forth.

7. The combination in an apparatus for exhibiting successive photographs, of a picture-belt for the pictures in succession, there being perforations in the belt, a pulley and pins for giving motion to the picture-belt, a reel for containing the belt of pictures and another reel upon which the belt of pictures is wound as drawn along progressively and friction mechanism for giving motion to the respective reels, an endless septum-belt having openings at intervals, a pulley for moving the same and gearing connecting the pulley of the picture-belt and the pulley of the septum-belt, substantially as set forth.

8. The combination with a picture-belt and two reels connected with the respective ends, of an electric motor, a circuit-breaker and adjustable means for actuating the circuit-breaker to stop the motor and belt when unwound from one reel to the desired point, substantially as specified.

9. The combination with the picture-belt, the winding-reels and an electric motor and gearing and belts for moving the picture-belt, of a slide and belt-tighteners and automatic mechanism for breaking the circuit to the motor when the belt of pictures has been moved its proper length, substantially as specified.

10. The combination with the picture-belt, the winding-reels and an electric motor and gearing and belts for moving the picture-belt, of a slide and belt-tighteners and automatic mechanism for breaking the circuit to the motor when the belt of pictures has been moved its proper length and circuit-changing contacts for reversing the circuits to the motor as the slide is moved, substantially as specified.

11. The combination with the electric motor, the gearing and the picture-belt moved by the same, of a wheel having a segmental slot and an adjustable pin in the same, and means for rotating such wheel slowly and with the picture-belt and a circuit-breaker actuated by such pin for stopping the picture-belt after being moved to the proper point, substantially as specified.

12. The combination with a picture-belt and two reels connected with its respective ends, of an electric motor and circuit-breaker, and adjustable means for actuating such circuit-breaker and stopping the motor and belt when unwound from one reel to the desired point and a hand-actuated device for reversing the circuit connections and the direction of rotation of the motor, substantially as set forth.

Signed by me this 23d day of September, 1895.

A. N. PETIT.

Witnesses:
   GEO. T. PINCKNEY,
   WILLIAM G. MOTT.